June 25, 1929.  S. F. WALTON  1,718,264
RECLAMATION OF ABRASIVE MATERIALS
Filed Nov. 9, 1927
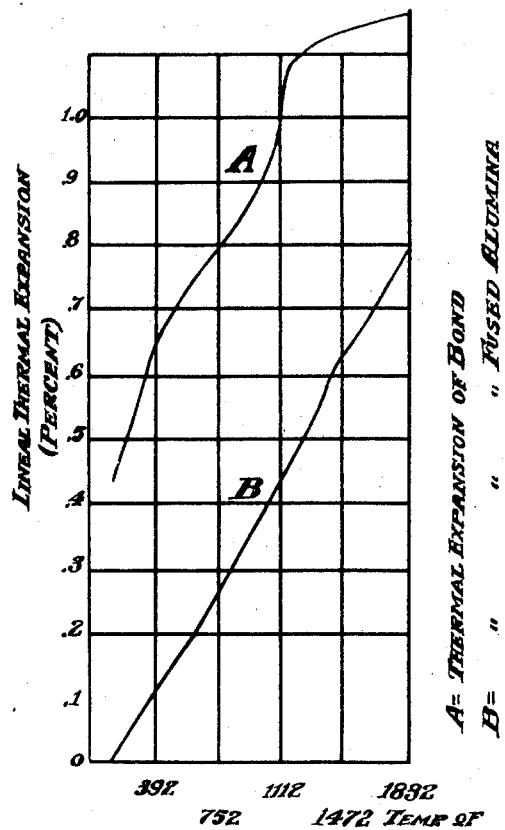
Inventor
Samuel F. Walton
By Ellis Spackman
Attorney Patented June 25, 1929.

1,718,264

UNITED STATES PATENT OFFICE.

SAMUEL F. WALTON, OF HAMBURG, NEW YORK, ASSIGNOR TO THE EXOLON COMPANY, OF BLASDELL, NEW YORK, A CORPORATION OF MASSACHUSETTS.

RECLAMATION OF ABRASIVE MATERIALS.

Application filed November 9, 1927. Serial No. 232,205.

In the reclamation of abrasive or refractory scrap, the primary problem has been that of detaching and eliminating the bond from the grain or particles of the material to be recovered.

Various methods have been proposed but my present invention provides a concept of extreme simplicity and little expense. For such it has a high efficiency. The bond of such materials or articles as I propose to reclaim are of a vitreous or semi-vitreous character.

My invention recognizing the possibilities of the nature of these bonds, especially as to their coefficients of expansion, proposes to utilize these characteristics as a basis of separation of bond from recoverable particles.

The expansion of a silicate is not a straight line curve. At some temperatures the expansion is greater than at either higher or lower temperatures. If a silicate is heated beyond this point of sudden expansion and then chilled, a greater contraction occurs, thus subjecting the material to a shattering shock. This shattering has a tendency to separate materials of dissimilar coefficients of expansion, particularly when one of these materials, such as abrasive grain, has almost a straight line low expansion. Also, this shattering has a tendency to produce in a silicate, minute shatterings or cracks, thus making the breaking down of the silicate readily possible.

For the purposes of present disclosure I take abrasive scrap as an example. Such scrap from worn wheels or grinders contains silicon carbide and aluminum oxide which are characteristic constitutents easily affected by chemical treatments.

Avoiding the difficulties of such treatments, I propose to operate on a more purely physical basis under which I utilize the physical properties of the bond as a medium of separation.

The common bonds whether vitreous or semi-vitreous or of enamel or procelain type are characterized by a shattering tendency when subjected to sudden and extreme changes in temperature. This increase in frangibility in physical reaction is, I find, capable of utilization in commercial process. The single figure of the drawing is graphically illustrative of a characteristic treatment of a characteristic mix.

While the coefficients of expansion vary in different bonds, they all differ characteristically from those of the abrasive and refractory materials ordinarily used. The characteristic difference may be indicated by the following comparative graphs in which the line B represents the thermal expansion of fused alumina, while the line A represents that of a characteristic bond, as for example, aluminum silicate. It will be noted in this graph that there is a very rapid or abrupt rise at about 1100° F. This abrupt rise in expansion is followed in the abrupt drop on cooling so that there is for bonds of this type a temperature at which the material undergoes a very sudden contraction in cooling. This temperature may be called its shatter point.

In proceeding in accordance with my invention, therefore, I heat the mixture sufficiently above this shatter point to be assured that it will pass this point in its cooling. In this heating, of course, I avoid any such high temperatures as would produce fusion and merely heat high enough to be sure that when the mass is suddenly cooled or quenched that it must pass through the temperature or temperatures of the shatter points.

For example, I may take such scrap as old abrasive wheels or refractory linings. These I crush to say an 8 mesh size. I then heat to about 1700° F. or approximately a temperature beyond which this sudden expansion takes place. I then pour the heated material into a body of water, at say normal temperature. I dry the grain and slightly mull. This frees a very large percentage of the bond so that the recoverable grain may be economically treated to secure a substantially free clean grain substantially as good as grain of like size newly made.

It is to be understood that the scrap treated may be of any source and my method may be practiced separately or in conjunction with other steps, methods or processes. The scope of my invention is defined by the appended claims.

What I therefore claim and desire to secure by Letters Patent is:—

1. As a reclamation process for separating the bonded grains of abrasive or refractory scrap from their bond, the method consisting in heating the scrap and in suddenly cooling to render the bond relatively friable, and in mulling to reduce the bond to a separable state.

2. As a reclamation process for separating the bonded grains of abrasive or refractory scrap from their bond, the method consisting in heating the comminuted scrap and in suddenly quenching to render the bond relatively friable, and in mulling to reduce the bond to a separable state.

3. As a reclamation process for separating the bonded grains of abrasive or refractory scrap from their bond, the method consisting in heating the comminuted scrap to a high temperature and in suddenly quenching to render the bond relatively friable, and in mulling to reduce the bond to a separable state.

4. As a reclamation process for separating the bonded grains of abrasive or refractory scrap from their bond, those steps consisting in reducing to a granular state, in heating to a relatively high temperature, and in quenching to produce a friable state.

5. As a reclamation process for separating the bonded grains of abrasive or refractory scrap from their bond, those steps consisting in reducing to a granular state, in heating substantially to fusion and in quenching to produce a friable state.

6. The method of producing relative disintegration of the bonded grains of abrasive or refractory scrap from their bond, such grains and bond having different coefficients of expansion, consisting in producing sudden thermal changes of disruptive tendency to one to the comparative exclusion of the other.

7. The method of producing relative disintegration of the bonded grains of abrasive or refractory scrap from their bond, such grains and bond having different coefficients of expansion, consisting in producing sudden thermal changes of disruptive tendency to one to the comparative exclusion of the other.

8. The method of separating the bonded grains of abrasive or refractory scrap from their bond, such bond having a sudden contraction on cooling, consisting in heating the scrap to a temperature above its temperature of sudden contraction and in suddenly cooling.

9. As a reclamation process for separating the bonded grains of abrasive or refractory scrap from their bond, the method consisting in heating the scrap to a temperature above its shatter point and in suddenly cooling.

In testimony whereof I affix my signature.

SAMUEL F. WALTON.